April 15, 1941.  G. HEINISH  2,238,794
GOVERNOR CONTROL FOR POWER PLANTS
Filed Dec. 31, 1938   2 Sheets-Sheet 1

INVENTOR
GEORGE HEINISH
BY
ATTORNEYS

April 15, 1941.   G. HEINISH   2,238,794
GOVERNOR CONTROL FOR POWER PLANTS
Filed Dec. 31, 1938   2 Sheets-Sheet 2

INVENTOR
GEORGE HEINISH
BY Ely & Frye
ATTORNEYS

Patented Apr. 15, 1941

2,238,794

UNITED STATES PATENT OFFICE 2,238,794

GOVERNOR CONTROL FOR POWER PLANTS

George Heinish, Akron, Ohio, assignor to The Star Drilling Machine Company, Akron, Ohio, a corporation of Ohio Application December 31, 1938, Serial No. 248,675

4 Claims. (Cl. 264—3)

This invention relates to improvements in a governor control for power plants and constitutes a continuation in part of my application, Serial No. 86,115, filed June 19, 1936, which matured into Patent No. 2,145,352, January 31, 1939.

In my said prior application I have described and claimed a well drilling apparatus in which my novel governor control has been satisfactorily used and in this application I will particularly describe the governor control as applied to well drilling apparatus. However, it will be apparent that the present invention is not limited to use with well drilling apparatus and that it is adapted for use whenever it is desired to control a power plant in the manner I have proposed.

In well drilling apparatus of the type disclosed in Patent No. 2,145,352, the drilling tools are raised and lowered by the action of a spudder which is operated by a power unit from which energy is derived to assist the force of gravity in delivering a sharp blow with each down stroke of the tools. In prior apparatus of this type the drilling motion depended on a speed variation of this power unit to get a quick drop and a long pickup. The operator would set the carburetor throttle in an open position so that the engine would deliver an average power, no means being provided to vary the power delivered in accordance with the power demand. As a result the engine speed decreased when the load came on during the pickup stroke and increased during the drop stroke, thereby obtaining a quick drop and a long pickup. To obtain a drilling motion it was necessary to have the pitman connections placed practically over the center of the crankshaft whereby a substantially equal pickup and drop stroke was inherent to the drill because the engine operated as aforesaid. The ratio of power available to the load together with the proportioning of the component parts of the drill being fixed, a good drilling motion was obtained only for one load condition. A change in the load caused a proportional change in the drilling motion, and with no means provided for compensating for variable loads, a good drilling motion was not obtained at all times. Because such apparatus was built for average conditions it was not suitable for all conditions.

It obviously is more desirable to have apparatus wherein the drilling motion will be suited as nearly as possible to all conditions, to have the apparatus so constructed that the drilling motion is an inherent feature not affected by load variations, and it is possible with this invention to provide such apparatus wherein the drilling motion is novel in that the engine, countershaft and crankshaft are run at substantially a constant speed by means of my novel governor control, assisted, if necessary, by power stored up in other parts of the apparatus, and to obtain the drilling motion by inherent, mechanical relationship of the component parts of the apparatus.

Furthermore, in prior apparatus it was usually necessary to race the engine to start drilling and to slip the clutch and open the throttle quickly as the load came on in order to prevent stalling. Also it was necessary to close the throttle quickly when drilling was stopped to prevent engine racing. It is an object of this invention to provide a governor which will open and close the engine throttle whereby the power delivered by the engine will be varied to meet the power demand, thereby eliminating any tendency of the engine to race or stall.

A further object is to provide a novel governor control for power plants, more particularly internal combustion engines.

Other objects and advantages will become apparent from the following description taken in conjunction with the accompanying drawings.

In the drawings—

Figure 1:
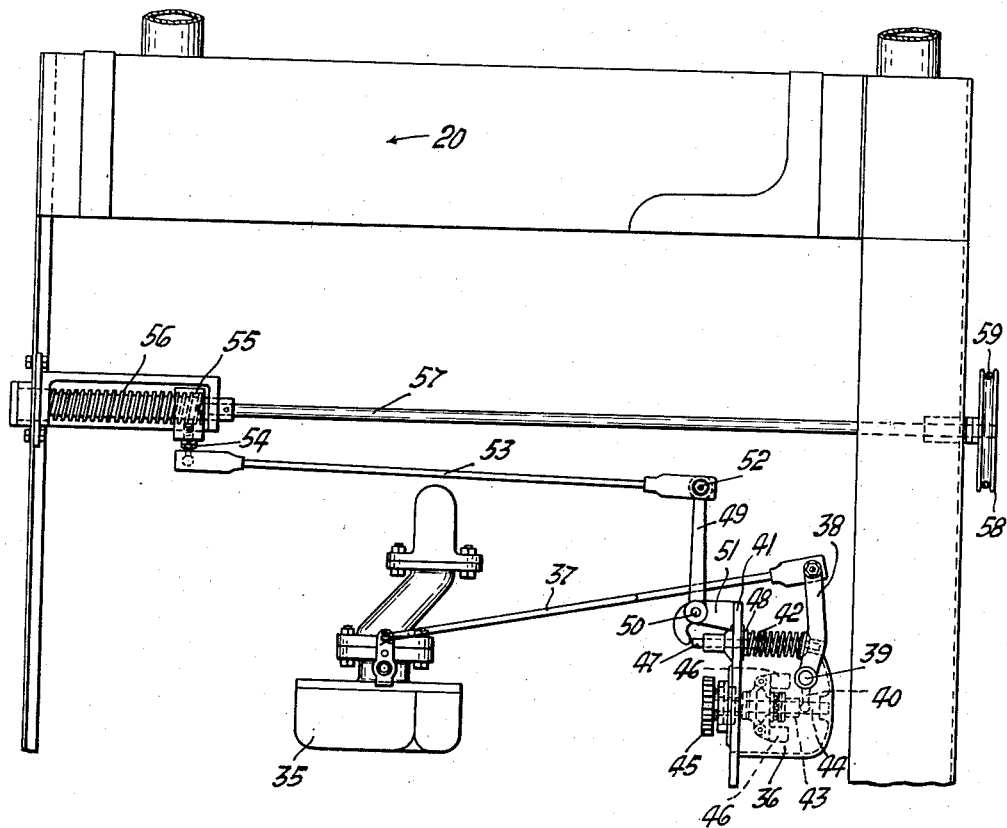
Figure 1 is an enlarged detail view of my novel governor control and parts associated therewith.

Referring to Figure 1 of the drawings the numeral 20 designates a power unit which in this instance comprises an internal combustion engine of the type shown in Patent No. 2,145,352, which is adapted to have driving connections (not shown) with all of the operating parts of the well drilling apparatus shown in said patent, and for further details of the operation of the various parts reference may be had to said patent. The numeral 35 designates the carburetor of the power unit 20 which has a flyweight governor 36 associated therewith. A rod 37 has one end connected to the usual throttle valve in the carburetor and its other end connected to one end of an arm 38. The latter is fixed to a rock shaft 39 which also has a depending arm 40 fixed thereto. Between arm 38 and a flange 41 on the governor housing is a compression coil spring 42 which is adapted to urge arm 38 away from the flange to open the carburetor throttle, which movement urges arm 40 toward a sleeve 43 slidably mounted on a shaft 44. Shaft 44 is rotatably mounted in the governor housing and has a portion extending outwardly thereof to which a gear 45 is fixed, said gear being in mesh with suitable gearing (not shown) driven by the cam shaft of the engine 20. Mounted for rotation with shaft 44 are the customary fly weights 46 which are adapted to be moved in and out by centrifugal force as will be understood. Outward movement of the fly weight is adapted to slide sleeve 43 toward arm 40 and to move the latter arm, shaft 39 and arm 38 against the action of spring 42 and consequently to close the throttle valve.

Initially I set the throttle valve for running the engine at a rate of speed determined to be suitable for the job to be performed. This is done manually by a pin 47 which extends through an opening in flange 41 and has an enlarged end 48 bearing against spring 42, the other end of said pin being engaged by one end of a lever 49 which is pivoted as at 50 to a lug 51 carried by flange 41. The other end of lever 49 is swivelly connected as at 52 to a rod 53 which in turn is connected to a lug 54 carried by a nut 55 through which extends the threaded end 56 of a manually rotatable shaft 57. The arrangement of nut 55 is such that when shaft 57 is turned the nut will move on the threaded end of the shaft and move rod 53 to vary the force applied by lever 49 against pin 47. I provide for manual turning of shaft 57 from a remote point by fixing a small pulley 58 on the end of the shaft outwardly of the supporting frame, which pulley is connected by a flexible cable 59 to a second pulley (not shown) mounted at any suitable point, whereby rotation of this second pulley will turn shaft 57.

It will be apparent that the throttle may be initially set by turning this second pulley and if the engine tries to speed up due to a lessening of the load the fly weights will be moved outwardly and sleeve 43 moved to cut down the flow of gas through the throttle. As the gas is cut down the speed of the engine will be reduced, the fly weights will move inwardly and spring 42 will open the throttle. Likewise, if the engine tries to slow down, as on the tool pickup stroke, the fly weights will move farther inwardly and pull sleeve 43 so that spring 42 will open the throttle to increase the speed of the engine, which increase will move the fly weights outwardly and tend to return the throttle to the initial position. Thus it will be seen that one of the functions of the governor is to open and close the engine throttle so that the power delivered by the engine will be varied to meet the power demand. Also, the governor tends to maintain the engine speed substantially at the rate initially determined to be suitable.

My governor control is different from the usual control in that it is not just a maximum speed limiting governor but one that will maintain the engine's speed anywhere in its whole range and still permit development of the full power of the engine if the load demands it.

Figure 2:
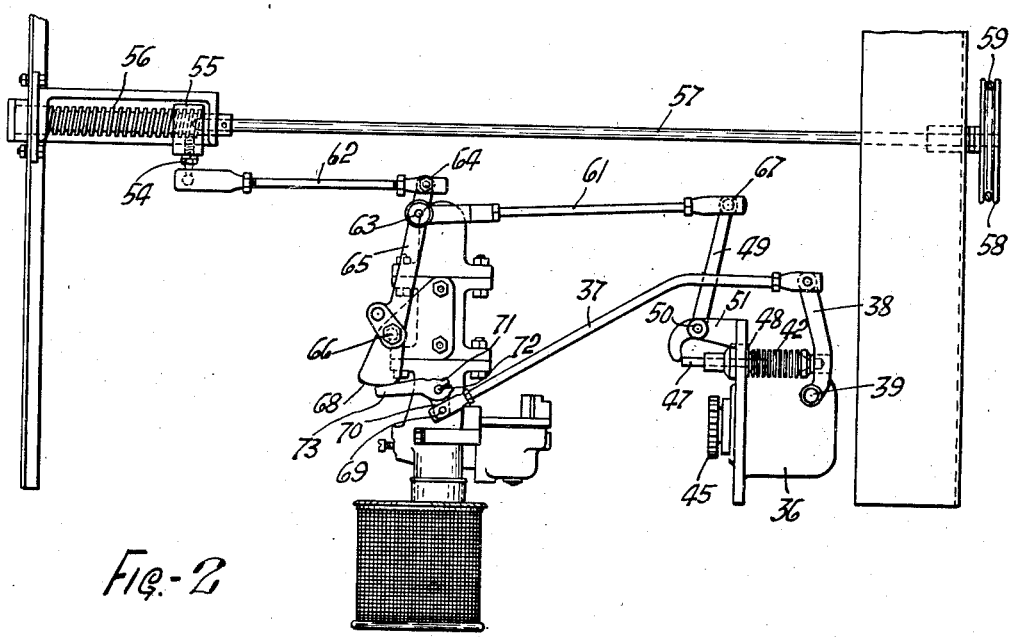
Figure 2 is an enlarged detail view of a modified form of governor control.

In Fig. 2 I have shown a modified form of governor control in which means are provided for preventing the closing of the throttle valve beyond a predetermined point. That is, the valve is initially set for running the engine at a rate of speed determined to be suitable for the particular job, and any increase in power required by an additional load being imposed on the engine will be automatically taken care of by the governor control. But, should the load become lightened the governor can only decrease the speed of the engine to the point initially set.

Referring to Fig. 2, the governor 36 and the parts directly associated therewith are identical with those shown in Fig. 1. Likewise the shaft 57 and parts directly associated therewith are the same as illustrated in Fig. 1. The rod 53 of Fig. 1, however, has been displaced by a pair of rods 61 and 62, the inner ends of which are pivotally connected as at 63 and 64 respectively to one end of a lever 65 which is pivoted intermediate its ends as at 66 to the engine manifold. The outer end of rod 61 is swivelly connected to lever 49 as at 67, and the outer end of rod 62 is similarly connected to lug 54 of nut 55. The connection 64 is preferably adjacent the end of lever 65 while connection 63 is slightly inwardly of the end of the latter lever. On its opposite end, lever 65 is provided with a cam surface 68 for a purpose to be described.

In this embodiment of the invention, rod 37 is pivotally connected as at 69 to one arm 70 of a bell crank lever 71 mounted to turn shaft 72 of the throttle valve and control the flow of gas therethrough. Arm 73 of lever 71 is arranged for engagement by the cam surface 68 of lever 65.

As a result of this arrangement, when the valve is initially set for running the engine at a rate of speed determined to be suitable for the particular job, rods 61 and 62 not only regulate the position of pin 47 with respect to spring 42, but they also simultaneously move lever 65 in direct proportion to the movement of lever 49 which bears against pin 47. Thus, regardless of what position of the throttle is selected as the initial position, the cam surface 68 on lever 65 will be in a position to prevent movement of the arm 73 beyond the point of engagement with the cam. Hence, bell crank lever 71, after its position is initially set, can turn counterclockwise (as viewed in Fig. 2) in response to movements of rod 37 which further open the throttle when an increase in power is required due to increased loads on the engine. Also, as the engine loads decrease and the bell crank returns in a clockwise direction, such return is not hindered until arm 73 engages cam 78, but after such engagement no further clockwise movement of the bell crank is possible. Accordingly, with this form of the invention a positive means is provided at all times to prevent the closing of the throttle valve beyond the point initially set regardless of the amount of decrease in the load imposed on the engine.

The advantages accruing from this modification will be apparent when it is realized that a well drilling apparatus in operation can make from 50 to 60 strokes per minute, and the load on the engine is varying each stroke as required by the lift and fall of the tools. Therefore, the bell crank 71 moves in both directions during each stroke and is moving substantially constantly during the drilling operation except when unusual or erratic loads are imposed on the engine. In the form of the invention shown in Fig. 1, when unduly large variations in load are imposed on the engine and where the throttle valve is permitted to move beyond its initial position toward a completely closed position, it is possible to stall the engine if the throttle on any stroke is permitted to completely close, or nearly completely close, since the return movement of the throttle lever on the stroke in question may not be quick enough to take care of the load being imposed on the engine. The embodiment in Fig. 1 is, however, entirely satisfactory when the drill is operated under favorable load conditions. For operations under unusual load conditions, the embodiment of Fig. 2 is preferred since it is impossible for the throttle valve to close beyond its initial setting, unless, of course, such setting be changed manually by the operation of rod 57. The embodiment of Fig. 2 shows my novel governor control adapted for use with the well known "Hercules" engine.

Figure 3:
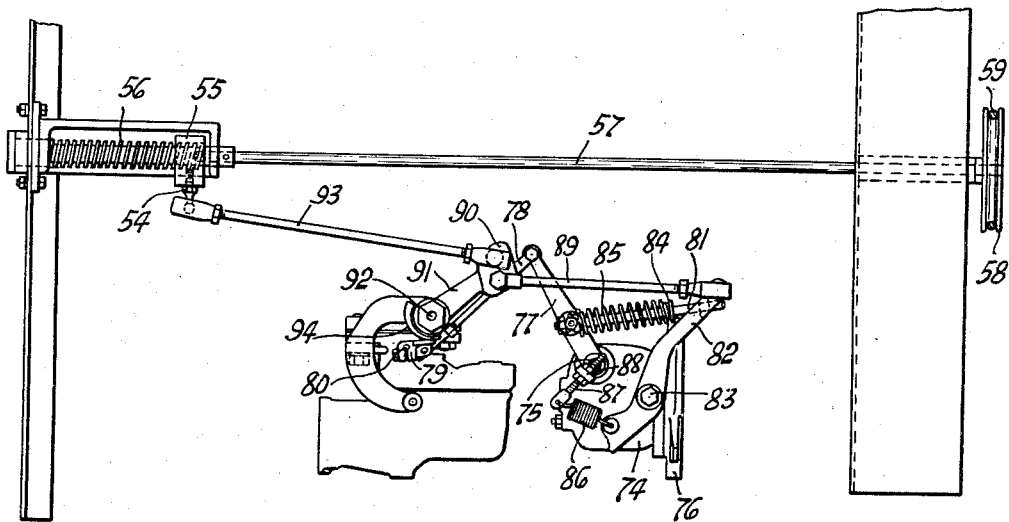
Figure 3 is a similar view of another modified form of governor control.

In Fig. 3 I have shown a further modification wherein my governor control is associated with an engine of the "Continental" type. In this embodiment the position of the governor 74 is reversed from that shown in the previous figures whereby the shaft 75, similar to the shaft 39, is on the opposite side of the housing flange 76. Shaft 75 has one end of a lever 77 connected thereto and rockable therewith, similar to lever 38, while the opposite end of lever 77 is connected to one end of a rod 78. The other end of rod 78 is connected to a small lever 79 which is connected with shaft 80 of the throttle valve to turn the latter shaft and regulate the valve.

Intermediate its ends, lever 77 has one end of a rod 81 connected thereto and the other end of the latter rod is slidably connected to a lever 82 pivoted to the governor housing as at 83. Rod 81 has a slidable collar 84 thereon and a compression spring 85 is arranged between this collar and lever 77, the arrangement being such that spring 85 may push lever 77 away from lever 82 as required by the action of the governor to open the valve. The lower end of the lever 82 has one end of a small coil spring 86 connected thereto and the opposite end of the latter spring is connected to a bolt 87 threaded in a projection 88 formed on lever 77. In operating the arrangement shown in Fig. 3, the initial movement of lever 82 in opening the engine throttle applies a tension first to spring 86, and further movement of lever 82 brings it into contact with collar 84 to apply compression to spring 85, thus obtaining the combined action of both springs on lever 82. The use of the two springs 86 and 85 is desirable because the centrifugal force developed by the governor weights is not uniform and it is sometimes desirable to have a low spring tension, such as is imposed by spring 86 for low speeds of the engine, and a high spring tension, such as is imposed by the combined action of both springs for high speeds of the engine.

The upper end of lever 82 has one end of a rod 89 connected thereto, which is similar to rod 61, and the other end of the rod is connected to an enlarged head 90 formed on lever 91 pivoted to the manifold as at 92. Also connected to head 90 is one end of a rod 93, similar to rod 62, and the other end of the rod 93 is connected to lug 54 of nut 55, whereby turning of shaft 57 will open the throttle valve to any desired setting. A cam surface 94 is formed on the lower end of lever 91 to be engaged by valve lever 79 to prevent closing movement of the valve after the cam surface is engaged by the latter lever. Lever 91 and its cam 94 are initially set when shaft 57 is turned, in the same manner as lever 65 and cam 68 in the embodiment shown in Fig. 2, so that closing movement of the valve past the position initially set is prevented. Therefore, the embodiment of Fig. 3 retains all the advantages referred to in connection with Fig. 2.

Variations in the contour of cam surfaces 68 and 94 can be made to give any desired characteristics of throttle closing to suit variable load requirements. Cam contours can also be made to compensate for governor inefficiencies causing "governor hunting."

It is believed to be obvious that I have disclosed a governor control which is well adapted to control the engine speed in drilling operations, and it is apparent that the invention is not limited to this use, since it may be used to control the engine speed in any situation where such control is desired.

Although I have illustrated and described the preferred embodiments of my invention, it will be apparent to those skilled in the art that the invention is not so limited but that various modifications may be made therein without departing from the spirit of the invention or from the scope of the subjoined claims.

What is claimed is:

1. In combination, a power unit including a throttle valve, a governor, connections between said governor and throttle valve to control the operation of the latter, said connections comprising a rock shaft, an arm connected to said shaft, a rod connected between said arm and said throttle valve, and a spring operatively connected to said arm, the arrangement being such that said spring tends to rock said arm in one direction while said governor tends to rock said arm in the opposite direction, means for initially setting said spring to open the throttle valve a predetermined amount, and means for preventing closing of the throttle valve beyond its initial setting.

2. In combination, a power unit including a throttle valve, a governor, connections between said governor and throttle valve to control the operation of the latter, said connections comprising a rock shaft, an arm connected to said shaft, a rod connected between said arm and said throttle valve, and a spring operatively connected to said arm, the arrangement being such that said spring tends to rock said arm in one direction while said governor tends to rock said arm in the opposite direction, means for initially setting said spring to open the throttle valve a predetermined amount, means for preventing closing of the throttle valve beyond its initial setting, and connections between said last two means for operating them simultaneously.

3. In combination, a power unit including a throttle valve, a governor, connections between said governor and throttle valve to control the operation of the latter including a spring operated arm for moving said valve in one direction against the action of said governor tending to move said valve in the opposite direction, means for initially setting said arm to open the throttle valve a predetermined amount, and means for preventing closing of the throttle valve beyond its initial setting.

4. In combination, a power unit including a throttle valve, a governor, connections between said governor and throttle valve to control the operation of the latter including a spring operated arm for moving said valve in one direction against the action of said governor tending to move said valve in the opposite direction, means for initially setting said arm to open the throttle valve a predetermined amount, means for preventing closing of the throttle valve beyond its initial setting, and connections between said last two means for operating them simultaneously.

GEORGE HEINISH.